United States Patent
Lerch et al.

(10) Patent No.: US 10,427,528 B2
(45) Date of Patent: Oct. 1, 2019

(54) VEHICLE

(71) Applicant: Mahle International GmbH, Stuttgart (DE)

(72) Inventors: Boris Lerch, Stuttgart (DE); Rolf Mueller, Steinheim/Murr (DE); Thomas Riemay, Korb (DE)

(73) Assignee: Mahle International GmbH (DE)

( * ) Notice: Subject to any disclaimer, the term of this patent is extended or adjusted under 35 U.S.C. 154(b) by 1 day.

(21) Appl. No.: 15/573,477

(22) PCT Filed: May 2, 2016

(86) PCT No.: PCT/EP2016/059783
§ 371 (c)(1),
(2) Date: Nov. 12, 2017

(87) PCT Pub. No.: WO2016/180657
PCT Pub. Date: Nov. 17, 2016

(65) Prior Publication Data
US 2018/0354369 A1    Dec. 13, 2018

(30) Foreign Application Priority Data

May 13, 2015    (DE) .................. 10 2015 208 859

(51) Int. Cl.
*F02G 5/04*    (2006.01)
*B60L 11/14*    (2006.01)
(Continued)

(52) U.S. Cl.
CPC ............. *B60L 11/14* (2013.01); *B60L 15/20* (2013.01); *B60L 50/16* (2019.02); *B60L 58/12* (2019.02);
(Continued)

(58) Field of Classification Search
CPC .. B60L 11/14; B60L 11/1861; B60L 11/1868; B60L 15/20; B60L 2260/26;
(Continued)

(56) References Cited

U.S. PATENT DOCUMENTS

| | | | | |
|---|---|---|---|---|
| 4,132,283 A | * | 1/1979 | McCurry | B60K 6/12 180/165 |
| 5,000,003 A | * | 3/1991 | Wicks | F01K 23/065 60/618 |

(Continued)

FOREIGN PATENT DOCUMENTS

| | | |
|---|---|---|
| DE | 102004053155 A1 | 5/2006 |
| DE | 69929736 T2 | 11/2006 |

(Continued)

OTHER PUBLICATIONS

English abstract for DE-102010044889.
English abstract for JP-2009126303.
English abstract for JP-20000-045817.

*Primary Examiner* — Mark A Laurenzi
*Assistant Examiner* — Shafiq Mian
(74) *Attorney, Agent, or Firm* — Fishman Stewart PLLC

(57) ABSTRACT

A vehicle may include an internal combustion engine configured to drive a plurality of wheels of the vehicle via a drive train. A waste heat utilization device may drive an electric generator by converting the waste heat generated by the internal combustion engine. The generator may be electrically connected to an on-board electrical system comprising an electric energy store and at least one electric consumer. An electric motor may be coupled to the drive train to provide an additional drive. The generator may convert kinetic energy generated by the waste heat utilization device into electrical energy and to provide the electrical energy to the on-board electrical system and/or to the electric motor. The electric motor may convert electrical (Continued)

energy provided by the electric energy store of the on-board electrical system and/or by the generator into kinetic energy and may couple the same into the drive train.

20 Claims, 6 Drawing Sheets

(51) Int. Cl.
  *B60L 15/20* (2006.01)
  *B60L 50/16* (2019.01)
  *B60L 58/12* (2019.01)
  *B60L 58/20* (2019.01)
(52) U.S. Cl.
  CPC .............. *B60L 58/20* (2019.02); *F02G 5/04* (2013.01); *B60L 2200/36* (2013.01); *B60L 2220/14* (2013.01); *B60L 2240/443* (2013.01); *B60L 2260/26* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7275* (2013.01)
(58) Field of Classification Search
  CPC ............. B60L 2200/36; B60L 2220/14; B60L 2240/443; F02G 5/04
  See application file for complete search history.

(56) References Cited

U.S. PATENT DOCUMENTS

| | | | | |
|---|---|---|---|---|
| 5,327,987 A * | 7/1994 | Abdelmalek | ............ | B60K 6/24 180/65.25 |
| 5,549,174 A * | 8/1996 | Reis | ............ | B60K 6/12 180/165 |
| 6,218,586 B1 * | 4/2001 | Takada | ............ | C07C 17/04 570/165 |
| 7,056,251 B2 * | 6/2006 | Ibaraki | ............ | B60K 6/44 475/5 |
| 8,055,425 B2 * | 11/2011 | Aswani | ............ | B60W 30/02 477/7 |
| 8,555,640 B2 * | 10/2013 | Samuel | ............ | B60K 6/48 60/618 |
| 2004/0063535 A1 * | 4/2004 | Ibaraki | ............ | B60K 6/44 477/3 |
| 2004/0216460 A1 * | 11/2004 | Ruggieri | ............ | F01K 17/02 60/670 |
| 2005/0198982 A1 * | 9/2005 | Kubo | ............ | B60H 1/00978 62/236 |
| 2007/0007771 A1 * | 1/2007 | Biddle | ............ | B01D 53/002 290/7 |
| 2009/0200865 A1 | 8/2009 | Grossner et al. | | |
| 2010/0146949 A1 * | 6/2010 | Stobart | ............ | B60H 1/00492 60/300 |
| 2010/0146992 A1 * | 6/2010 | Miller | ............ | F17C 3/04 62/47.1 |
| 2011/0192163 A1 * | 8/2011 | Kasuya | ............ | F01K 13/02 60/624 |
| 2012/0073294 A1 * | 3/2012 | Enokijima | ............ | F01K 13/02 60/660 |
| 2012/0329603 A1 | 12/2012 | Yamazaki et al. | | |
| 2013/0056992 A1 * | 3/2013 | Wada | ............ | F01K 23/065 290/1 A |
| 2014/0172207 A1 | 6/2014 | Akashi et al. | | |
| 2016/0160750 A1 | 6/2016 | Mueller et al. | | |
| 2016/0214465 A1 * | 7/2016 | Zhou | ............ | F01K 23/065 |
| 2016/0322814 A1 * | 11/2016 | Melnyk | ............ | F02G 5/02 |

FOREIGN PATENT DOCUMENTS

| | | |
|---|---|---|
| DE | 102006044004 B3 | 4/2008 |
| DE | 602004011087 T2 | 1/2009 |
| DE | 102010044889 A1 | 5/2011 |
| DE | 102013217032 A1 | 6/2014 |
| DE | 102013213569 A1 | 1/2015 |
| EP | 1326017 A1 | 7/2003 |
| JP | 20000-045817 A | 2/2000 |
| JP | 2009126303 A | 6/2009 |
| WO | WO-2010083198 A1 | 7/2010 |

* cited by examiner

VEHICLE

CROSS-REFERENCE TO RELATED APPLICATIONS

This application claims priority to International Application PCT/EP2016/059783 filed on May 2, 2016, and to German Applicatin DE 10 2015 208 859.6 filed on May 13, 2015, the contents both of which are hereby incorporated by reference in their entirety.

TECHNICAL FIELD

The invention at hand relates to a vehicle, in particular a utility vehicle.

A vehicle is typically equipped with an internal combustion engine, which, in operation, drives wheels of the vehicle via a drive train. Furthermore, a vehicle typically has an on-board electrical system, which has a generator, which is driven by the internal combustion engine and which is typically referred to as alternator, and which includes at least one electric energy store, which is typically referred to as vehicle battery, as well as at least one electric consumer. Electric consumers are electric and electronic devices for operating the internal combustion engine as well as electric or electronic components, respectively, of the vehicle.

BACKGROUND

A system for utilizing waste heat from an exhaust gas system is known from DE 10 2013 213 569, in which mechanical power can be provided by an expansion machine via a magnetic gear at a drive shaft at a reduced speed, for example to support an internal combustion engine.

The invention at hand deals with the problem of specifying an improved embodiment for a vehicle of the above-mentioned type, which is in particular characterized by an improved energy management.

According to the invention, this problem is solved by means of the subject matter of the independent claims. Advantageous embodiments are the subject matter of the dependent claims.

It is thus the basic idea of the invention to equip a vehicle with a generator and an electric motor, which can be coupled to one another as well as to an on-board electrical system of the motor vehicle, which has an electric energy store as well as at least one electric consumer. Such a configuration makes it possible to operate the vehicle as a function of a respective current system state of internal combustion engine, waste heat utilization device, electric consumer and electric energy store in different operating states, and to optimize the electrical energy management of the motor vehicle in this way. In particular, an additional, separate alternator can be forgone, because this function can be taken over by the generator and/or by the electric motor.

SUMMARY

A vehicle according to the invention, in particular a utility vehicle, comprises an internal combustion engine, which, in operation, drives wheels of the vehicle via a drive train. The vehicle further comprises a waste heat utilization device, which, in operation, drives an electric generator, which generates electrical energy, by converting the waste heat generated by the internal combustion engine. The generator is thereby electrically connected to an on-board electrical system, which comprises an electric energy store and at least one electric consumer. The vehicle furthermore comprises an electric motor, which forms an additional drive and, for this purpose, is coupled to the drive train of the vehicle. In operation, the generator converts kinetic energy generated by the waste heat utilization device into electrical energy and provides the same to the on-board electrical system comprising the energy store and the electric consumer as well as in the alternative or in addition to the electric motor—depending on the current operating state of the motor vehicle. The electric motor, in operation, converts electrical energy provided by the electric energy store of the on-board electrical system and/or by the generator into kinetic energy and couples the same into the drive train of the vehicle.

In the case of a preferred embodiment, the electric motor and/or the generator comprise the function of an alternator, so that a separately embodied alternator is not present in the vehicle. This means that the provision of a separate alternator can be forgone. This leads to significant cost savings when producing the motor vehicle.

In the case of a further preferred embodiment, the electric motor has the function of a start device for activating the internal combustion engine, so that a separately embodied start device is not present in the vehicle. This means that the provision of a separate start device can be forgone. This leads to significant cost savings when producing the motor vehicle. If the electric motor is to be used as starter for the internal combustion engine, it can obtain electrical energy from the electric energy store for this purpose.

In the case of a preferred embodiment, the vehicle has a first operating state, in which the amount of energy stored in the electric energy store is above a predetermined threshold value. The threshold value is thereby preferably determined such that the electric energy store is virtually or completely emptied in the event that the threshold value is fallen below, so that it can provide only a small amount of or no energy at all to the consumers of the on-board electrical system and/or to the electric motor. In the first operating state, the amount of energy stored in the electric energy store is also below an amount of energy, which can maximally be absorbed in the energy store. In the first operating state, the generator and the electric motor are active in each case, thus in operation, wherein a portion of the electrical energy generated by the generator is stored in the electric energy store, so that the latter is filled in this way. The first operating state is a nominal, thus "normal" operating state of the vehicle.

In a further preferred embodiment, which can be combined with one or a plurality of the above-explained preferred embodiments, the vehicle has a second operating state, in which the amount of energy stored in the electric energy store corresponds to the amount of energy, which can maximally be absorbed in the energy store. In this second operating state as well as in the first operating state, the generator and the electric motor are in operation, are thus active. In contrast to the first operating state, however, the electrical energy generated by the generator is only supplied to the at least one electric consumer of the on-board electrical system and/or to the electric motor, but not to the electric energy store in the second operating state.

In a further preferred embodiment, which can be combined with one or a plurality of the above-explained preferred embodiments, the vehicle has a third operating state, in which the amount of energy stored in the electric energy store maximally corresponds to the predetermined threshold value. In the third operating state, the waste heat utilization device and thus also the generator are not in operation, are thus in each case in an inactive state, in which they do not generate any electrical energy. In this inactive state, no amount of waste heat or not the amount of waste heat required for operation is supplied to the waste heat utilization device from the internal combustion engine. In the third operating state, the electric motor is in a generator operation, in which the electric motor generates electrical energy and is provided to the on-board electrical system, including its at least one consumer, as well as to the electric energy store.

According to another preferred embodiment, which can be combined with one or a plurality of the above-explained preferred embodiments, the vehicle has a fourth operating state. In the fourth operating state, an external torque demand made on the internal combustion engine exceeds a predetermined torque threshold value. Such a torque demand can be initiated by the driver of the vehicle, when he wants to accelerate the vehicle to a large extent or even maximally. The generator as well as the electric motor are thus active in the fourth operating state. The electrical energy generated by the electric generator is thereby supplied completely to the electric motor, so that the latter can generate an additional drive torque and can couple into the drive train.

In an advantageous further development of the invention, the electrical energy stored in the electric energy store can be supplied to the on-board electrical system in the fourth operating state, or this electrical energy can be supplied to the on-board electrical system. This means that said electrical energy is at least available to the electric consumers, so that it can be accessed by the electric consumers, if needed.

In a "boost mode", however, electrical energy from the electric energy store can also be provided to the electric motor in the fourth operating state. This corresponds to a partial hybridization of the motor vehicle.

In a further preferred embodiment, the vehicle can finally have a fifth operating state. In the fifth operating state, the waste heat utilization device is in a non-working state, in which it does not generate any kinetic energy. The fifth operating state is typically an operating state, in the case of which the internal combustion engine has not warmed up yet shortly after its start-up, and thus does not generate sufficient waste heat so as to be able to operate the waste heat utilization device. In the fifth operating state, the generator and the electric motor are in each case also in an inactive state, in which they do not generate any electrical or kinetic energy, respectively. In the fifth operating state, the electrical energy stored in the electric energy store is supplied to the on-board electrical system or is at least available to be supplied, so that it can be accessed by the electric consumers if needed. In the fifth operating state, the electrical energy stored in the electric energy store is supplied to the at least one electric consumer of the on-board electrical system or can be supplied to this consumer.

In an advantageous further development of the invention, the waste heat utilization device has a turbine comprising a turbine wheel. Said turbine wheel is connected in a torque-proof manner to a rotor, which is part of the generator, and which, together with the turbine wheel, can be rotationally adjusted about an axis of rotation, which, in turn, defines an axial direction. The generator further has a stator, which is also part of the generator and which has at least two electric coils on a front side, which axially faces the rotor. The generator has at least two magnetic elements, which, on a front side of the rotor, which faces the stator, are arranged on said rotor. The arrangement is thereby made in such a way that an electrical induction voltage is induced in the at least two electric coils during a rotational movement of the rotor relative to the stator. The electrical energy generated in this way can be provided to the on-board electrical system comprising the electric energy store and to the at least one electric consumer as well as, in the alternative or additionally, to the electric motor.

In an alternative, the generator as asynchronous generator can also be operated by means of electric short-circuit rotors instead of magnetic elements.

In a further preferred embodiment, the vehicle can comprise an additional on-board electrical system, which is electrically connected to the generator, the electric motor, and the on-board electrical system. The additional on-board electrical system, in turn, comprises a control unit, by means of which it can be controlled, which percentage of the electrical energy generated by the generator will be provided to the on-board electrical system comprising the electric energy store, and which percentage will be provided to the electric motor. An optimal distribution of the electrical energy generated by the generator can be ensured in this way, in particular in the second operating state of the vehicle.

Particularly advantageously, the on-board electrical system can be a low-voltage on-board electrical system, in particular a 12V on-board electrical system, and the additional on-board electrical system can be a high-voltage on-board electrical system, in particular a 48V on-board electrical system.

Further important features and advantages of the invention follow from the subclaims, from the drawings and from the corresponding figure description by means of the drawings.

It goes without saying that the above-mentioned features and the features, which will be described below, cannot only be used in the respective specified combination, but also in other combinations or alone, without leaving the scope of the invention at hand.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically

DETAILED DESCRIPTION

Figure 1:
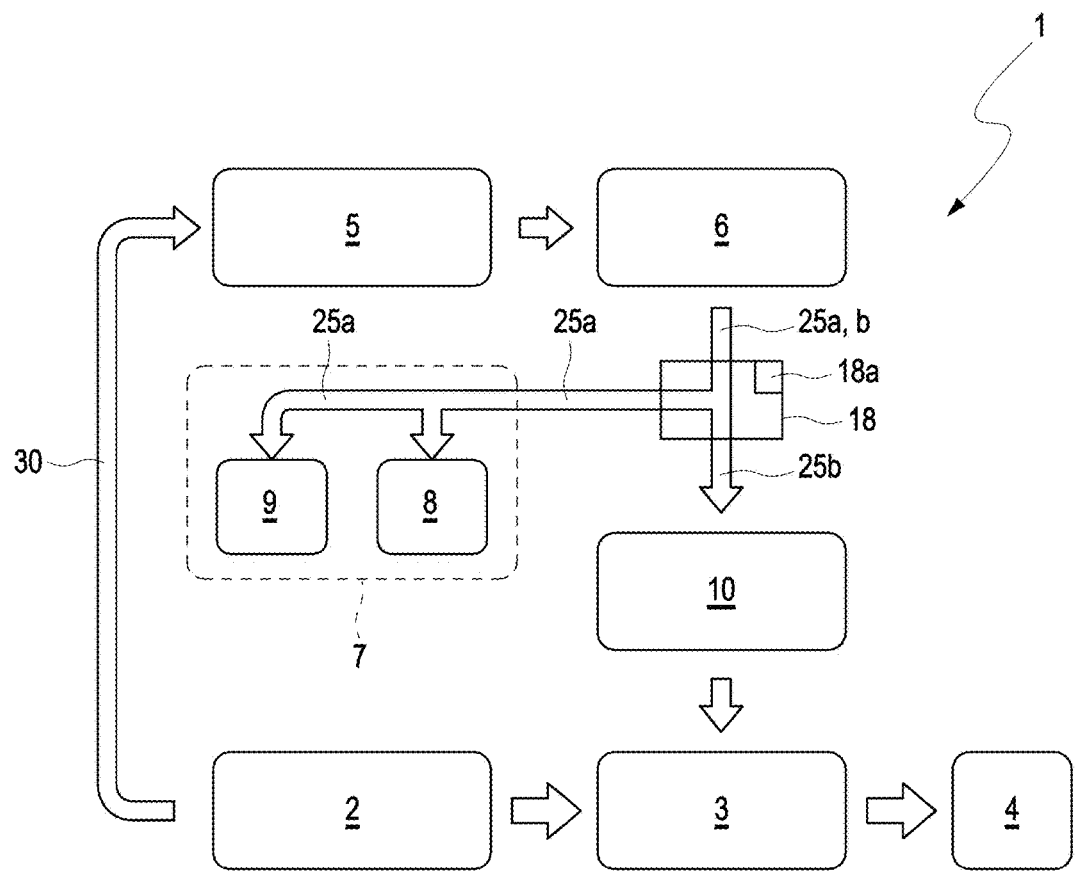
FIGS. 1-5 shows a roughly schematic design of a vehicle according to the invention in different operating state.
Figure 6:
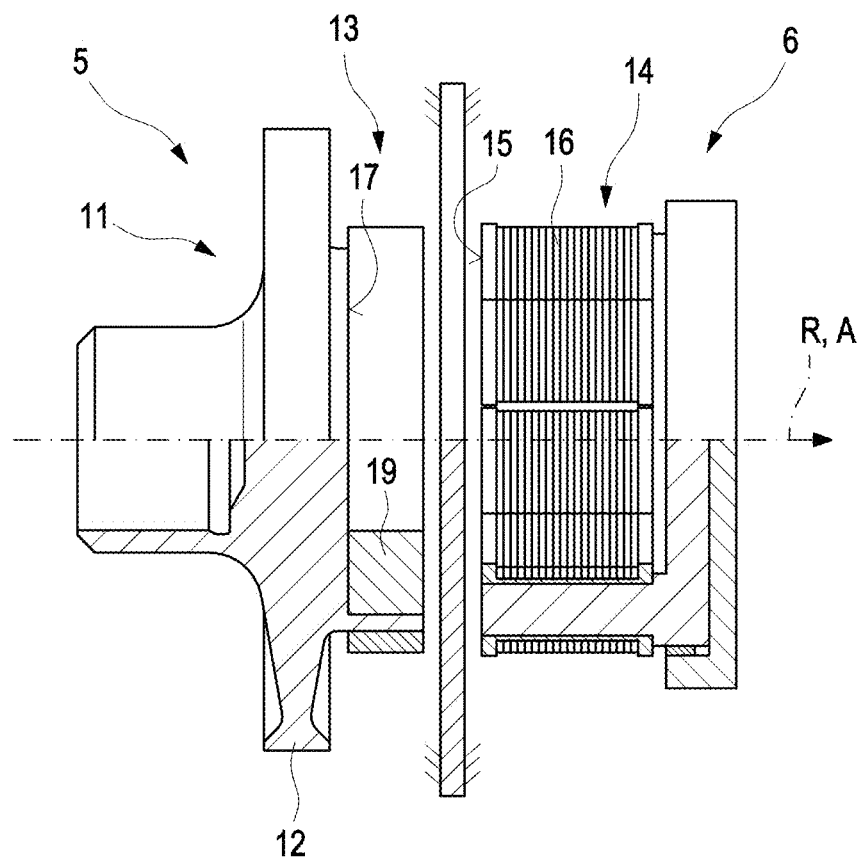
FIG. 6 shows an example for the structural design of a waste heat utilization device installed in the vehicle.

In a circuit diagram-like illustration, FIG. 1 shows the design of a vehicle 1 according to the invention, which can in particular be a utility vehicle. The vehicle 1 comprises an internal combustion engine 2, which, in operation, drives wheels 4 of the vehicle 1 via a drive train 3. The vehicle 1 furthermore comprises a waste heat utilization device 5. In operation, the waste heat utilization device 5 drives an electric generator 6 of the vehicle 1 by converting the waste heat generated by the internal combustion engine 2 (see arrow 30 in FIG. 1). The generator 6 is electrically connected to an on-board electrical system 7 of the vehicle 1. The on-board electrical system 7 comprises an electric energy store 8, for example in the form of a rechargeable electric battery, and electric consumers 9, for example an illuminating device and an air conditioning system. The vehicle 1 furthermore comprises an electric motor 10, which is coupled to the drive train 3. In addition to the internal combustion engine 2, the electric motor 10 acts as additional drive for the drive train 3. In the example of the figures, the electrical connection of the generator 6 and of the electric motor 10 to the on-board electrical system 7, which can be a 12V on-board electrical system, thus a low-voltage on-board electrical system, is realized via an additional on-board electrical system 18. The additional on-board electrical system 18 can be a 48V on-board electrical system, thus a so-called high-voltage on-board electrical system. In operation, the generator 6 converts the kinetic energy provided by the waste heat utilization device 5 into electrical energy and provides the same to the on-board electrical system 7 and/or to the electric motor 10. As clearly illustrated by the illustration of FIG. 6, the waste heat utilization device 5 comprises a turbine 11 with a turbine wheel 12. The turbine wheel 12 is connected in a torque-proof manner to the rotor 13, which is part of the generator 6 and which, together with the turbine wheel 12, can be rotationally adjusted about an axis of rotation R, which defines an axial direction A. The waste heat generated by the internal combustion engine 2 in operation (see arrow 30) drives the turbine wheel 12 in operation of the waste heat utilization device 5, and thus the rotor 13. On a front side 15, which axially faces the rotor 13, a stator 14 of the generator 6 has a plurality of magnetic coils 16. The generator 6 further has a plurality of magnetic elements 19, which, on a front side 17 of the rotor 13 facing the stator 14, are arranged on said rotor. The arrangement is thereby made in such a way that an electrical induction voltage is induced in the electric coils during a rotational movement of the rotor 13 relative to the stator 14 in operation of the generator 6. In operation, the electric motor 10 converts electrical energy provided directly by the electric energy store 8 of the on-board electrical system 7 and/or the generator 6 into kinetic energy and provides the same to the drive train 3. For this purpose, the electric motor can be equipped in the usual manner with a stator, which comprises electric coils, which generate an alternating magnetic field when suitable electrical current is applied. The alternating magnetic field can drive the magnets, which are present on a drive shaft of the drive train 3, by means of magnetic interaction, so that the electric motor 10 generates kinetic energy, which—in addition to the driving power, which is generated directly by the internal combustion engine 2—is coupled into the drive train.

The electric motor 6 and/or the generator 10 can have the function of an alternator, so that the provision of a separate alternator can be forgone. This leads to significant cost savings when producing the motor vehicle.

The electric motor 6 can furthermore also have the function of a start device for activating the internal combustion engine 2, so that a separately embodied start device for turning on the internal combustion engine 2 does not need to be provided in the vehicle 1.

In the example of the figures, the vehicle 1 has a first operating state, which corresponds to a "normal state" of the vehicle with an electric energy store 8, which is not filled completely, thus with a battery, which is not charged completely. In other words, the amount of energy stored in the electric energy store 8 is above a predetermined threshold value and below an amount of energy, which can maximally be absorbed in the energy store 8. An amount of energy, below which the electric energy store can no longer provide a predetermined electric output voltage, due to a lack of stored electrical energy, in the case of a rechargeable battery a nominal battery voltage, and is to thus be "filled" with electrical energy. In this first operating state, the generator 6 and the electric motor 10 are active, are thus in operation. A first portion of the electrical energy generated by the generator 6 is stored in the electric energy store 8 or is provided to the electric consumers 9 (see arrow 25*a* in FIG. 1). A complementary second portion of the electrical energy generated by the generator 6 is provided to the second electric motor 10 (see arrow 25*b* in FIG. 1), so that the latter can convert the second portion of the electrical energy into kinetic energy for the dive train 3.

Figure 2:
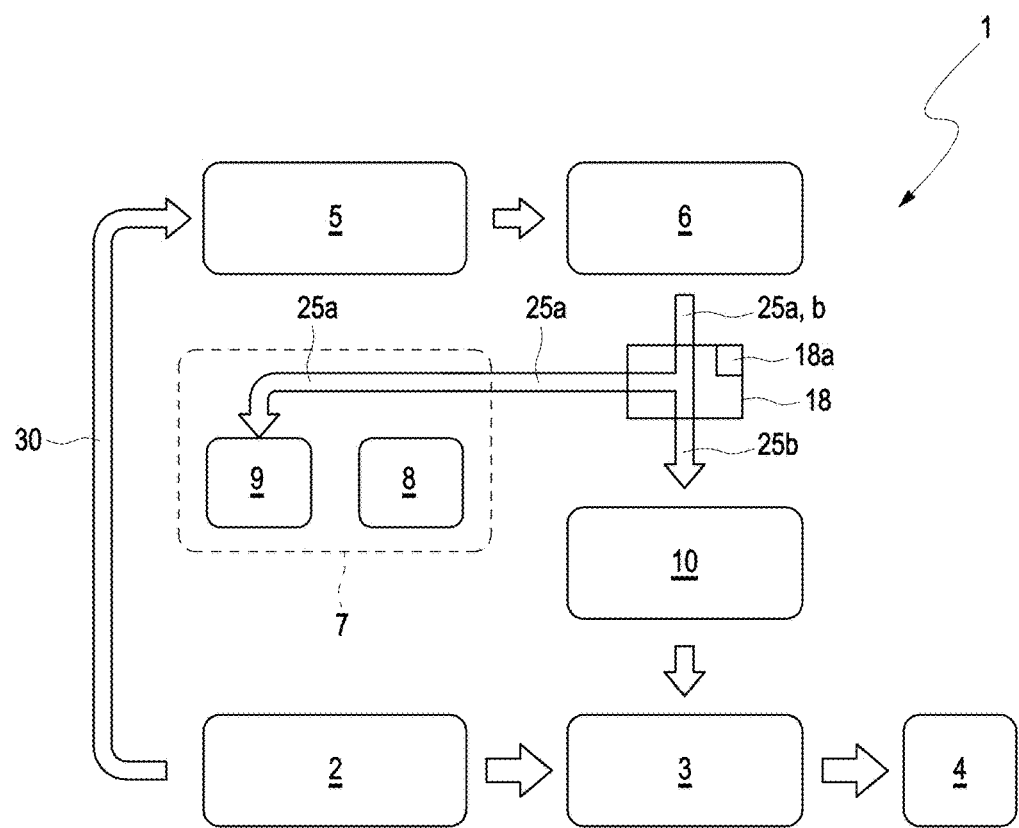

In addition to the first operating state, the vehicle also has a second operating state, which is illustrated schematically in FIG. 2. The second operating state differs from the first operating state in that the amount of energy stored in the electric energy store corresponds to the amount of energy, which can maximally be absorbed in the energy store. In the case of the rechargeable battery, the latter is maximally charged in the second operating state. The portion of electrical energy generated by the generator 6 supplied to the on-board electrical system 7 is thus only supplied to the electric consumers 9 and/or to the electric motor 10, but not to the electric energy store 8.

As can be seen in the Figures, the additional on-board electrical system 18 can comprise a control unit 18*a*. The percentage of the electrical energy generated by the generator 6, which is provided to the on-board electrical system 7 comprising the electric energy store 8, and the portion, which is provided to the electric motor 10, can be adjusted by means of the control unit 18*a*.

Figure 3:
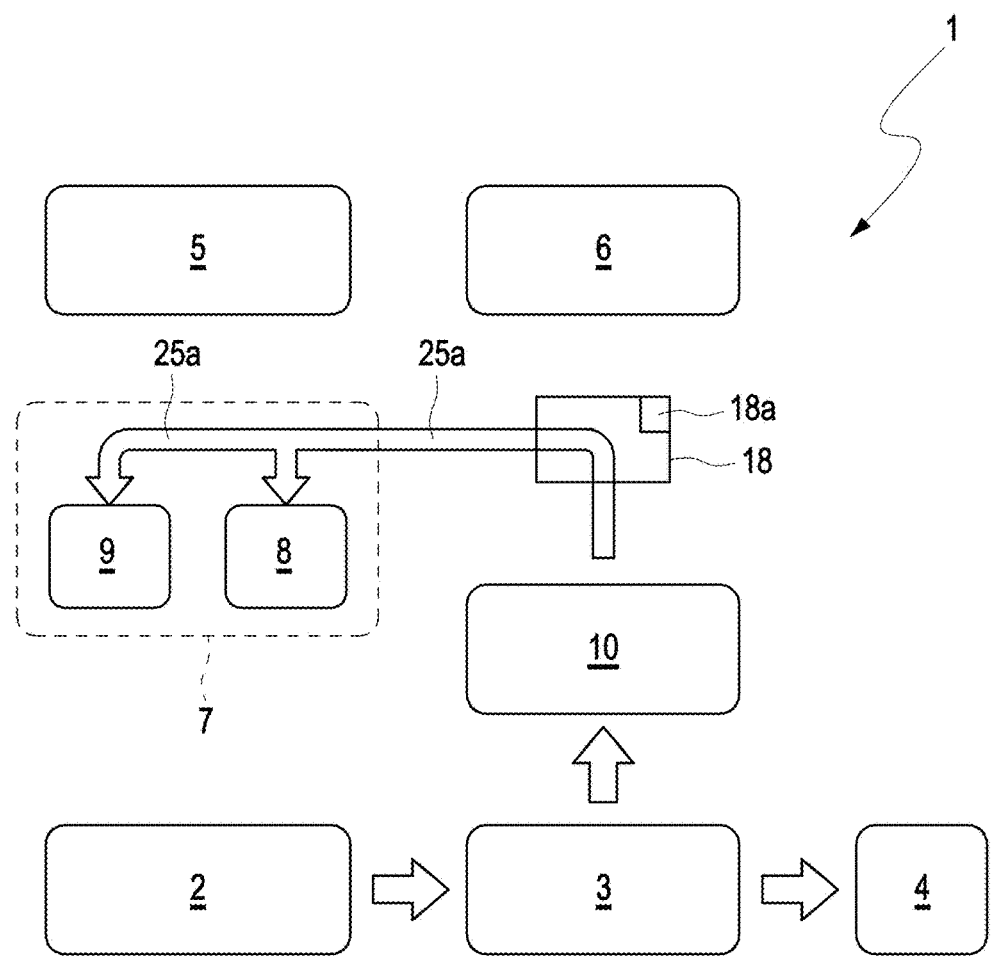

In a third operating state of the vehicle 1—which is shown schematically in FIG. 3—which differs from the first and second operating state—the amount of energy stored in the electric energy store 8 corresponds maximally to the predetermined threshold value. This means that electrical energy needs to be supplied to the electric energy store 8, when it is to be ensured that electrical energy is to be available to said electric energy store for removal by the electric consumer 9. In the third operating state, the waste heat utilization device 5 is in an inactive state, in which no waste heat from the internal combustion engine 2 is supplied to the waste heat utilization device 5 (see arrow 30 in FIGS. 1 and 2). The generator 6, which is drive-connected to the waste heat utilization device 5, thus also does not generate any electrical energy. In the third operating state of the vehicle 1, the electric motor 10 is in a generator operation, in which it generates electrical energy and provides it to the electric energy store 8, as well as, in the alternative or additionally, to the electric consumers 9 of the on-board electrical system 7. The electrical energy, which is not required by the electric consumers 9, is preferably stored in the electric energy store 8. In the third operating state, the internal combustion engine 2 does not provide sufficient waste heat to the waste heat utilization device 5, in order for the latter to be able to generate a significant amount of electrical energy by means of the generator 6.

Figure 4:
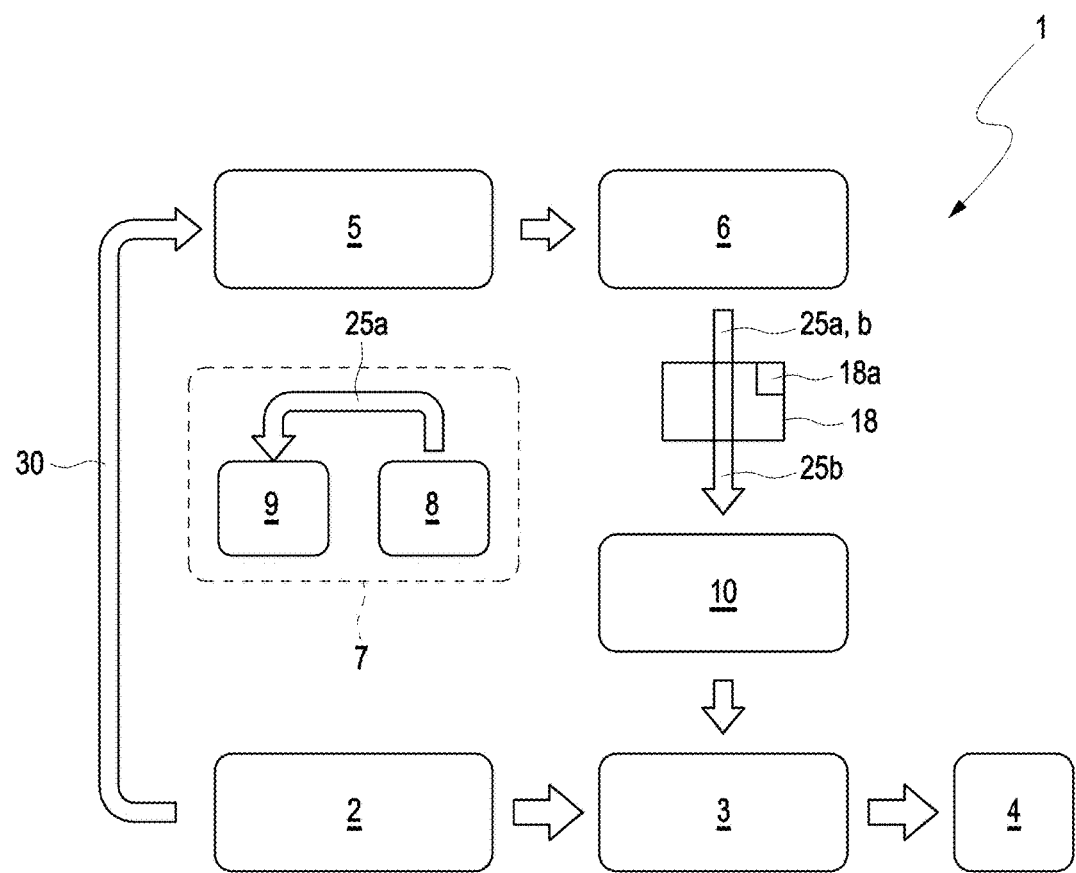

The vehicle 1 furthermore comprises a fourth operating state, which is illustrated schematically in FIG. 4, in which an external torque demand made on the internal combustion engine 2 exceeds a predetermined torque threshold value. Such a torque demand can for example be generated by means of a "kickdown" of a gas pedal of the vehicle 1 by its driver, when he desires a maximum or at least a high acceleration of the vehicle 1. In the fourth operating state, the generator 6 and the electric motor 10 are active, thus in operation. The electrical energy generated by the generator 6 is thereby only supplied to the second electric motor 10, but not to the on-board electrical system 7 comprising the electric energy store 8 and to the electric consumers 9. In the fourth operating state of the vehicle 1, the electrical energy stored in the electric energy store 8 is preferably supplied to the on-board electrical system 7.

In a so-called "boost mode" electrical energy, however, electrical energy from the electric energy store 8 can also be provided to the electric motor 10.

Figure 5:
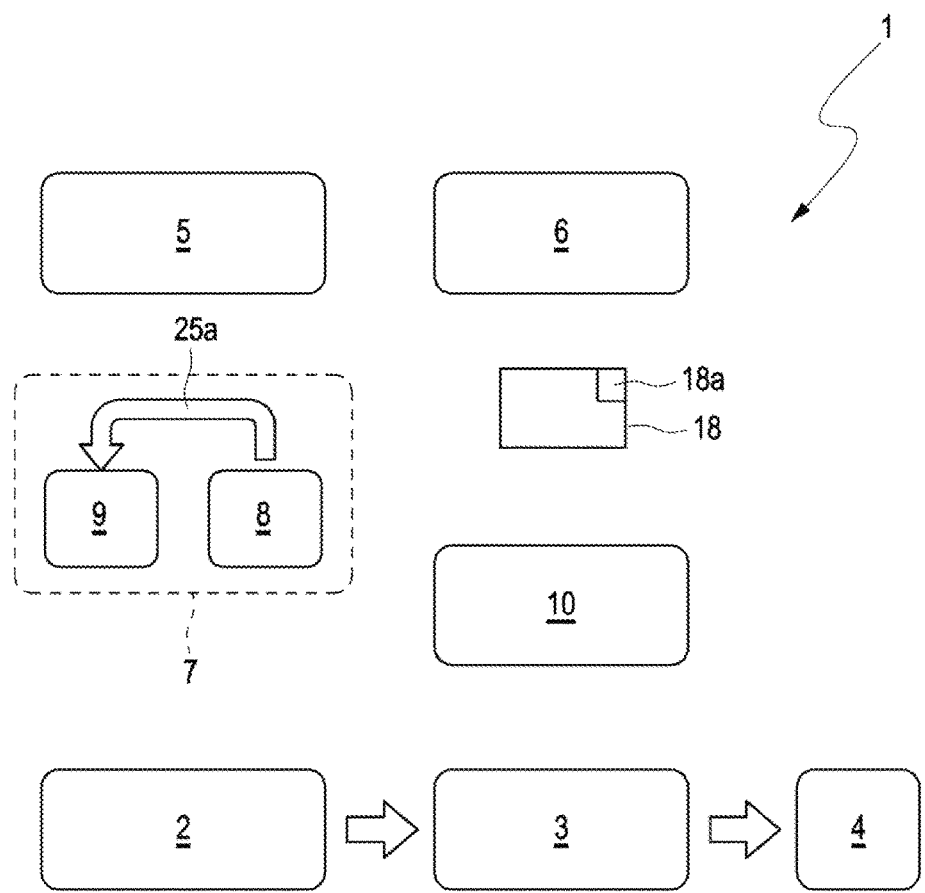

In a fifth operating state, which corresponds to an operating state of the vehicle 1 with internal combustion engine 2, which has not warmed up yet, an insufficient amount of waste heat for operating the waste heat utilization device 5 is available according to the illustration of FIG. 5. The waste heat utilization device 5 is thus in an inactive state, in which it does not generate any kinetic energy from waste heat of the internal combustion engine 2. The generator 6 is thus also inactive and does not generate any electrical energy. The fifth operating state furthermore also differs from the fourth operating state in that the electric motor 10 is also in an inactive state. In this state, it does not consume any electrical energy, but thus also does not provide any kinetic energy to the drive train 3. In the fifth operating state, the drive energy generated by the internal combustion engine 2 is only used to drive the wheels 4 of the vehicle 1. The conversion of a portion of the drive energy generated by the internal combustion engine 2 into electrical energy by using the electric motor 10 in the generator operation, as used in the fourth operating state, does not take place in the fifth operating state of the vehicle 1. In the fifth operating state, however, the electrical energy stored in the electric energy store 8 is available to the electric consumers 9 of the on-board electrical system 7.

The invention claimed is:

1. A vehicle comprising:
    an internal combustion engine configured to drive a plurality of wheels of the vehicle via a drive train during operation;
    a waste heat utilization device configured to drive an electric generator by converting a waste heat generated by the internal combustion engine during operation;
    wherein the generator is electrically connected to an on-board electrical system comprising an electric energy store and at least one electric consumer;
    an electric motor, the electric motor coupled to the drive train to provide an additional drive;
    wherein the generator is configured to convert kinetic energy generated by the waste heat utilization device into electrical energy and to provide the electrical energy to at least one of the on-board electrical system and to the electric motor during operation;
    wherein the electric motor is configured to convert electrical energy provided at least by one of the electric energy store of the on-board electrical system and the generator into kinetic energy and couples the same into the drive train;
    wherein, in an operating state where an amount of energy stored in the electric energy store maximally corresponds to a predetermined threshold value, the waste heat utilization device and the generator are in an inactive state where no waste heat is supplied to the waste heat utilization device from the internal combustion engine and the generator generates neither electrical energy nor kinetic energy, and the electric motor is in a generator operation where the electric motor generates electrical energy and provides the electrical energy to the on-board electrical system.

2. The vehicle according to claim 1, wherein at least one of the electric motor and the generator act as an alternator, so that a separately embodied alternator is not present in the vehicle.

3. The vehicle according to claim 1, wherein the electric motor acts as a start device for activating the internal combustion engine, so that a separately embodied start device is not present in the vehicle.

4. The vehicle according to claim 1, wherein, in a second operating state where the amount of energy stored in the electric energy store is above the predetermined threshold value and below a maximal amount of energy that can be absorbed in the electric energy store, the generator and the electric motor are each active and a portion of the electrical energy generated by the generator is stored in the electric energy store.

5. The vehicle according to claim 1, wherein, in a second operating state where the amount of energy stored in the electric energy store corresponds to a maximal amount of energy that can be absorbed in the electric energy store, the generator and the electric motor are in operation, and the electrical energy generated by the generator is only supplied to at least one of the at least one electric consumer and the electric motor, but not to the electric energy store.

6. The vehicle according to claim 1, wherein, in a second operating state where an external torque demand made on the internal combustion engine exceeds a predetermined torque threshold value, the electrical energy generated by the electric generator is supplied completely to the electric motor.

7. The vehicle according to claim 6, wherein, in the second operating state, the electrical energy from the electric energy store is provided to the electric motor.

8. The vehicle according to claim 6, wherein, in the second operating state, the electrical energy stored in the electric energy store is transferrable to the on-board electrical system.

9. The vehicle according to claim 1, wherein, in a second operating state where the waste heat utilization device is in a non-working state and does not generate any kinetic energy, the generator and the electric motor are in an inactive state and do not generate any electrical energy or kinetic energy, and the electrical energy stored in the electric energy store is transferrable to the at least one electric consumer of the on-board electrical system.

10. The vehicle according to claim 1, wherein:
    the waste heat utilization device includes a turbine, the turbine including a turbine wheel;
    the turbine wheel is connected in a torque-proof manner to a rotor, the rotor being part of the generator, and wherein the rotor together with the turbine wheel are rotationally adjustable about an axis of rotation defining an axial direction;
    the generator includes a stator, a front side of the stator having a plurality of electric coils axially facing the rotor; and
    the generator further includes a plurality of magnetic elements arranged on a front side of the rotor facing the stator such that an electrical induction voltage is induced in the plurality of electric coils during a rotational movement of the rotor relative to the stator.

11. The vehicle according to claim 1, further comprising an additional on-board electrical system electrically connected to the generator, the electric motor, and the on-board electrical system, wherein the additional on-board electrical system includes a control unit configured to control a percentage of the electrical energy generated by the generator provided to the on-board electrical system and a percentage of the electrical energy generated by the generator provided to the electric motor.

12. The vehicle according to claim 11, wherein the on-board electrical system is a low-voltage on-board electrical system and the additional on-board electrical system is a high-voltage on-board electrical system.

13. The vehicle according to claim 11, wherein the on-board electrical system is a 12V on-board electrical system and the additional on-board electrical system is a 48V on-board electrical system.

14. The vehicle according to claim 1, wherein:
in a second operating state where the amount of energy stored in the electric energy store is above the predetermined threshold value and below a maximal amount of energy that can be absorbed in the electric energy store, the generator and the electric motor are each active and a portion of the electrical energy generated by the generator is stored in the electric energy store;
in a third operating state where the amount of energy stored in the electric energy store corresponds to the maximal amount of energy that can be absorbed in the electric energy store, the generator and the electric motor are in operation and the electrical energy generated by the generator is only supplied to at least one of the at least one electric consumer and to the electric motor, but not to the electric energy store;
in a fourth operating state where an external torque demand made on the internal combustion engine exceeds a predetermined torque threshold value, the electrical energy generated by the electric generator is supplied completely to the electric motor; and
in a fifth operating state where the waste heat utilization device is in a non-working state and does not generate any kinetic energy, the generator and the electric motor are in an inactive state and do not generate any electrical energy or kinetic energy, and the electrical energy stored in the electric energy store is transferrable to the at least one electric consumer of the on-board electrical system.

15. The vehicle according to claim 1, wherein the electric motor in the generator operation provides the electrical energy to at least one of the electric energy store and the at least one electric consumer, and wherein the electrical energy that is not required by the at least one electric consumer is stored in the electric energy store.

16. A vehicle comprising:
an internal combustion engine configured to drive a plurality of wheels of the vehicle via a drive train during operation;
a waste heat utilization device configured to drive an electric generator by converting a waste heat generated by the internal combustion engine during operation;
wherein the generator is electrically connected to an on-board electrical system comprising an electric energy store and at least one electric consumer;
an electric motor, the electric motor coupled to the drive train to provide an additional drive;
wherein the generator is configured to convert kinetic energy generated by the waste heat utilization device into electrical energy and to provide the electrical energy to at least one of the on-board electrical system and to the electric motor during operation;
wherein the electric motor is configured to convert electrical energy provided at least by one of the electric energy store of the on-board electrical system and the generator into kinetic energy and couples the same into the drive train;
wherein, in an operating state where an external torque demand made on the internal combustion engine exceeds a predetermined torque threshold value, the electrical energy generated by the electric generator is supplied completely to the electric motor.

17. The vehicle according to claim 16, wherein, in the operating state, the electrical energy from the electric energy store is provided to the electric motor.

18. The vehicle according to claim 16, wherein, in the operating state, the electrical energy stored in the electric energy store is transferrable to the on-board electrical system.

19. A vehicle comprising:
an internal combustion engine configured to drive a plurality of wheels of the vehicle via a drive train during operation;
a waste heat utilization device configured to drive an electric generator by converting a waste heat generated by the internal combustion engine during operation;
wherein the generator is electrically connected to an on-board electrical system comprising an electric energy store and at least one electric consumer;
an electric motor, the electric motor coupled to the drive train to provide an additional drive;
wherein the generator is configured to convert kinetic energy generated by the waste heat utilization device into electrical energy and to provide the electrical energy to at least one of the on-board electrical system and to the electric motor during operation;
wherein the electric motor is configured to convert electrical energy provided at least by one of the electric energy store of the on-board electrical system and the generator into kinetic energy and couples the same into the drive train;
wherein, in an operating state where the waste heat utilization device is in a non-working state and does not generate any kinetic energy, the generator and the electric motor are in an inactive state and do not generate any electrical energy or kinetic energy, and the electrical energy stored in the electric energy store is transferrable to the at least one electric consumer of the on-board electrical system.

20. The vehicle according to claim 19, wherein, in a second operating state where an amount of energy stored in the electric energy store corresponds to a maximal amount of energy that can be absorbed in the electric energy store, the generator and the electric motor are in operation, and the electrical energy generated by the generator is only supplied to the at least one electric consumer and the electric motor, but not to the electric energy store.

* * * * *